(12) United States Patent
Huang (10) Patent No.: US 12,227,152 B2
(45) Date of Patent: Feb. 18, 2025

(54) BRAKE CALIPER

(71) Applicant: JIEH JIA ENTERPRISE CO., LTD., Changhua County (TW)

(72) Inventor: Jui-Fa Huang, Changhua County (TW)

(73) Assignee: JIEH JIA ENTERPRISE CO., LTD., Changhua County (TW)

( * ) Notice: Subject to any disclaimer, the term of this patent is extended or adjusted under 35 U.S.C. 154(b) by 407 days.

(21) Appl. No.: 17/929,728

(22) Filed: Sep. 5, 2022

(65) Prior Publication Data
US 2023/0082629 A1  Mar. 16, 2023

(30) Foreign Application Priority Data

Sep. 15, 2021 (TW) ................. 110134334

(51) Int. Cl.
| | | |
|---|---|---|
| B60T 13/58 | (2006.01) | |
| B60T 13/74 | (2006.01) | |
| F16D 55/228 | (2006.01) | |
| F16D 65/00 | (2006.01) | |
| F16D 65/18 | (2006.01) | |
| F16D 55/00 | (2006.01) | |
| F16D 121/04 | (2012.01) | |
| F16D 121/24 | (2012.01) | |
| F16D 125/40 | (2012.01) | |

(52) U.S. Cl.
CPC .......... *B60T 13/588* (2013.01); *B60T 13/746* (2013.01); *F16D 55/228* (2013.01); *F16D 65/0068* (2013.01); *F16D 65/0087* (2013.01); *F16D 65/18* (2013.01); *F16D 2055/0016* (2013.01); *F16D 2055/007* (2013.01); *F16D 2121/04* (2013.01); *F16D 2121/24* (2013.01); *F16D 2125/40* (2013.01)

(58) Field of Classification Search
CPC .... B60T 13/588; B60T 13/746; F16D 55/228; F16D 65/18; F16D 65/0068; F16D 65/0087; F16D 2055/0016; F16D 2055/007; F16D 2121/04; F16D 2121/24; F16D 2121/40
USPC ............................ 188/71.7–72.8, 156–164
See application file for complete search history.

(56) References Cited

U.S. PATENT DOCUMENTS

| 10,914,350 B2 * | 2/2021 | Noguchi ............... F16D 55/228 |
| 2019/0383336 A1 * | 12/2019 | Noguchi ............... F16D 55/226 |
| 2021/0215213 A1 * | 7/2021 | Liao ...................... F16D 65/567 |

FOREIGN PATENT DOCUMENTS

EP  3276199 A1 *  1/2018  ............ B60T 13/588

* cited by examiner

*Primary Examiner* — Christopher P Schwartz
(74) *Attorney, Agent, or Firm* — Sinorica International Patent & Trademark (57) ABSTRACT

A brake caliper has a fixed seat. The fixed seat has a first brake lining and a second brake lining. The fixed seat further has a first piston and a second piston that can be pushed by hydraulic oil. A movable seat is slidably disposed on the fixed seat. The movable seat has a link portion that can link the first brake lining and a drive unit that can push the second piston mechanically. The first piston and the second piston can be pushed hydraulically to drive the first brake lining and the second brake lining for braking. The drive unit pushes the second piston to drive the second brake lining, and pushes the movable seat to drive the first brake lining for braking.

10 Claims, 10 Drawing Sheets

BRAKE CALIPER

FIELD OF THE INVENTION

The present invention relates to a brake caliper, and more particularly to a brake caliper that is installed on the rear wheel of a vehicle and driven by the foot brake and the hand brake of the vehicle for braking.

BACKGROUND OF THE INVENTION

In general, vehicles have two sets of braking systems such as foot brake and hand brake. As to the foot brake system, the user pedals the brake pedal of the vehicle to drive brake oil to hydraulically push a hydraulic caliper to clamp the brake disc of the vehicle to lock the wheels for braking. When the user pulls a handbrake lever or activates an electronic handbrake switch, the handbrake system uses a wire or a motor to drive a mechanical caliper to clamp the brake disc of the vehicle to lock the wheels for braking.

However, not all vehicles have enough space for both the hydraulic caliper and the mechanical caliper. Therefore, some companies have developed integrated calipers that integrate hydraulic and mechanical structures. However, the existing integrated caliper simply adds a mechanical structure to the hydraulic caliper and has many shortcomings. The internal oil passage design for the flow of brake oil is not optimally integrated with the mechanical structure. Besides, the connection structure between the hydraulic caliper and the mechanical structure is not stable, and it is easy to sway in operation, affecting the braking effect of the integrated caliper greatly.

SUMMARY OF THE INVENTION

The primary object of the present invention is to provide a brake caliper, which can be driven by a foot brake and a hand brake of a vehicle for braking and has a superior braking effect.

In order to achieve the aforesaid object, the brake caliper provided by the present invention comprises a fixed seat. The fixed seat has at least one piston groove and a piston hole that are parallel to an axis. The fixed seat further has an oil passage communicating with the piston groove and the piston hole. The brake caliper further comprises a piston unit. The piston unit includes at least one first piston slidably disposed in the piston groove and a second piston slidably disposed in the piston hole. One side of the second piston, facing an outside of the fixed seat, is recessed with a receiving groove. A pushing member is slidably disposed in the receiving groove. A push space is defined between the pushing member and a bottom of the receiving groove. At least one first flow channel is defined between an outer wall surface the second piston and an inner wall surface of the piston hole. The first flow channel communicates with the oil passage. At least one second flow channel is defined between an inner wall surface the second piston and an outer wall surface of the pushing member. The second flow channel communicates with the push space. The brake caliper further comprises a cover. The cover is disposed on an outside of the piston hole. An inner wall surface of the cover has a blocking portion extending toward the piston hole. The blocking portion is formed with at least one perforation. When the second piston slides toward the cover and abuts against the blocking portion, the perforation communicates with the first flow channel and the second flow channel. The brake caliper further comprises a brake lining unit. The brake lining unit is disposed in the accommodating space. The brake lining unit has a first brake lining disposed close to the first piston and a second brake lining disposed close to the second piston. The brake caliper further comprises a movable seat. The movable seat can slide relative to the fixed seat parallel to the axis. The movable seat includes a link arm. A distal end of the link arm is provided with a link portion. The link portion is located between the first brake lining and the first piston. The brake caliper further comprises a drive unit. The drive unit is disposed on the movable seat. The drive unit is movable along with the movable seat. The drive unit has a drive rod. One end of the drive rod passes through the cover and is connected to the pushing member. Another end of the drive rod is provided with a connecting portion for connecting a drive source. The drive rod is driven by the drive source to screw the pushing member to slide in the receiving groove.

The brake caliper provided by the present invention is arranged on the periphery of a brake disc. When the user activates the foot brake of a vehicle, the hydraulic oil flows into the oil passage, a part of the hydraulic oil flows into the piston groove to push the first piston for driving the first brake lining to be against one side of the brake disc, and the other part of the hydraulic oil flows into the push space through the first flow channel and the second flow channel in sequence to push the second piston for driving the second brake lining to be against the other side of the brake disc, thereby achieving the purpose of foot braking. When the user activates the handbrake, the drive source drives the drive rod, the pushing member is driven by the drive rod to move toward the second piston to push the second piston for driving the second brake lining to be against one side of the brake disc, the drive rod pushes the movable seat to move away from the fixed seat in the opposite direction for the link portion to push the first brake lining to be against the other side of the brake disc, thereby achieving the purpose of hand braking.

DETAILED DESCRIPTION OF THE PREFERRED EMBODIMENTS

Embodiments of the present invention will now be described, by way of example only, with reference to the accompanying drawings.

Figure 1:
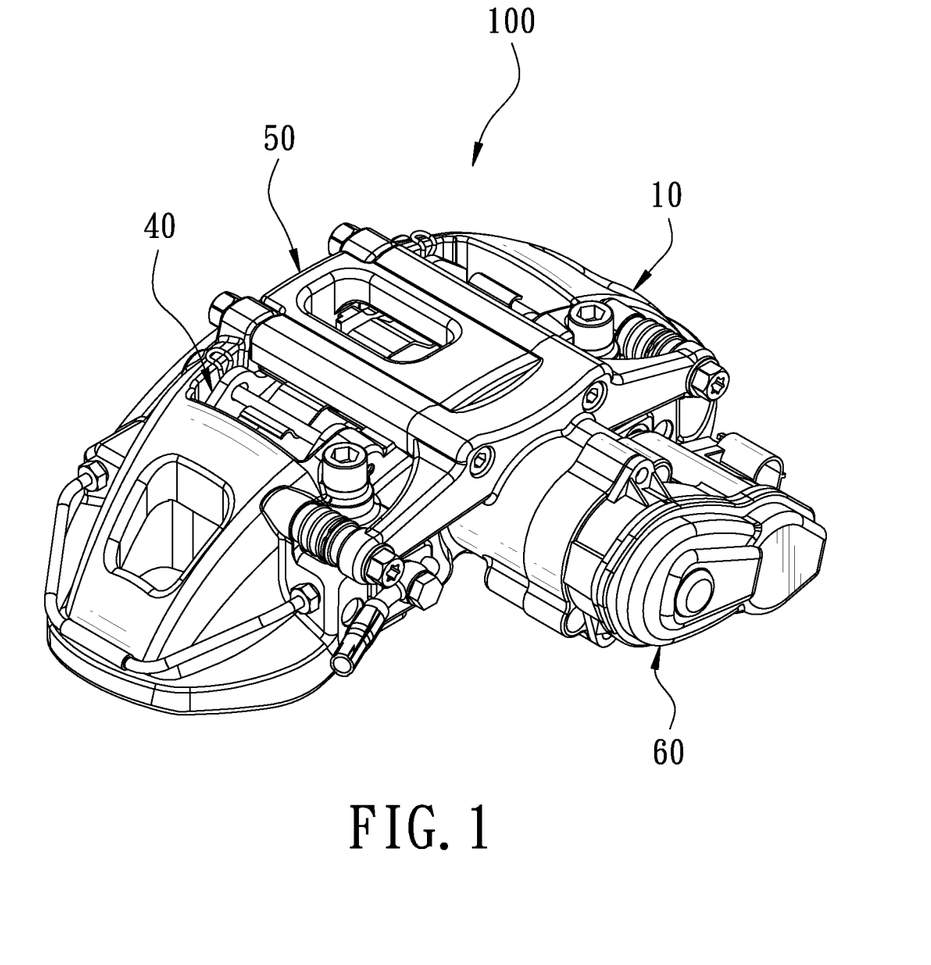
FIG. 1 is a perspective view in accordance with a preferred embodiment of the present invention.
Figure 2:
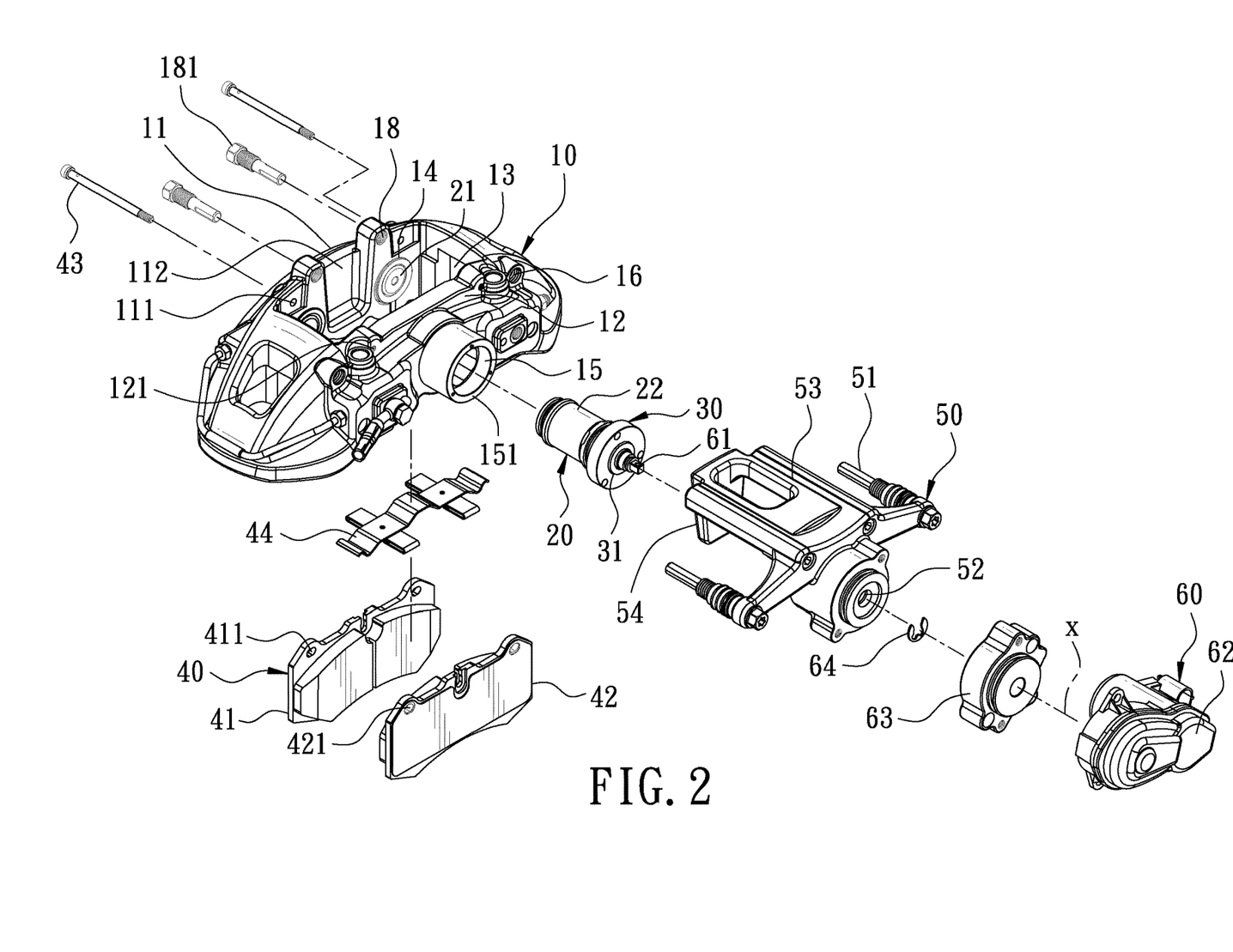
FIG. 2 is an exploded view in accordance with the preferred embodiment of the present invention.

FIG. 1 is a perspective view in accordance with a preferred embodiment of the present invention. FIG. 2 is an exploded view in accordance with the preferred embodiment of the present invention. The present invention discloses a brake caliper 100. The brake caliper 100 comprises an immovable seat 10, a piston unit 20, a cover 30, a brake lining unit 40, a movable seat 50, and a drive unit 60.

The fixed seat 10 has a first side wall 11, a second side wall 12 opposite to the first side wall 11, and an accommodating space 13 defined between the first side wall 11 and the second side wall 12. The inner wall surface of the first side wall 11 has at least one piston groove 14 parallel to an axis X and communicating with the accommodating space 13. The outer wall surface of the second side wall 12 has a piston hole 15 parallel to the axis X and communicating with the accommodating space 13.

The piston unit 20 includes at least one first piston 21 slidably disposed in the piston groove 14 and a second piston 22 slidably disposed in the piston hole 15.

The cover 30 is disposed on the outside of the piston hole 15 for confining the second piston 22 in the piston hole 15 so that the second piston 22 can only slide in the piston hole 15. The cover 30 has a central shaft hole 31 parallel to the axis X.

The brake lining unit 40 is disposed in the accommodating space 13. The brake lining unit 40 has a first brake lining 41 disposed close to the first piston 21, a second brake lining 42 disposed close to the second piston 22, and a plurality of fixing pins 43. The first side wall 11 has a plurality of first fixing holes 111, and the second side wall 12 has a plurality of corresponding second fixing holes 121. The first brake lining 41 has a plurality of first slide holes 411 corresponding to the first fixing hole 111. The second brake lining 42 has a plurality of second slide holes 421 corresponding to the second fixing hole 121. The fixing pins 43 are inserted through the first fixing holes 111, the first slide holes 411, the second slide holes 421 and the second fixing holes 121 respectively, so that the first brake lining 41 and the second brake lining 42 can only slide and move along the fixing pins 43 in the accommodating space 13. A pressing plate 44 is provided between the first brake lining 41 and the second brake lining 42.

The movable seat 50 is disposed adjacent to the outer side of the second side wall 12. The outer wall surface of the second side wall 12 further has at least two guide holes 16 parallel to the axis X. The movable seat 50 is provided with guide posts 51 corresponding to the respective guide holes 16. The guide posts 51 are inserted through the respective guide holes 16 so that the movable seat 50 can slide relative to the fixed seat 10 parallel to the axis X. The movable seat 50 has a positioning hole 52 corresponding to the shaft hole 31. The peripheral side of the movable seat 50 includes a link arm 53 extending toward the first side wall 11. The distal end of the link arm 53 is provided with a link portion 54. The link portion 54 is located between the first side wall 11 and the first brake lining 41. In this embodiment, the first side wall 11 is recessed with an accommodating groove 112 for accommodating the link portion 54.

The drive unit 60 is disposed on the movable seat 50 and is movable along with the movable seat 50. The drive unit 60 has a drive rod 61. One end of the drive rod 61 passes through the shaft hole 31 and is connected to the second piston 22. The other end of the drive rod 61 passes through the positioning hole 52 and is connected to a drive source 62. The drive rod 61 is driven by the drive source 62 to drive the second piston 22 to slide in the piston hole 15. The drive source 62 may be an electronic motor as shown in the figures, or a bead-disk structure or a lever pulled by a steel cable, but not limited thereto. An adapter seat 63 is provided between the drive source 62 and the movable seat 50 for connecting the drive source 62 of different specifications.

Figure 3:
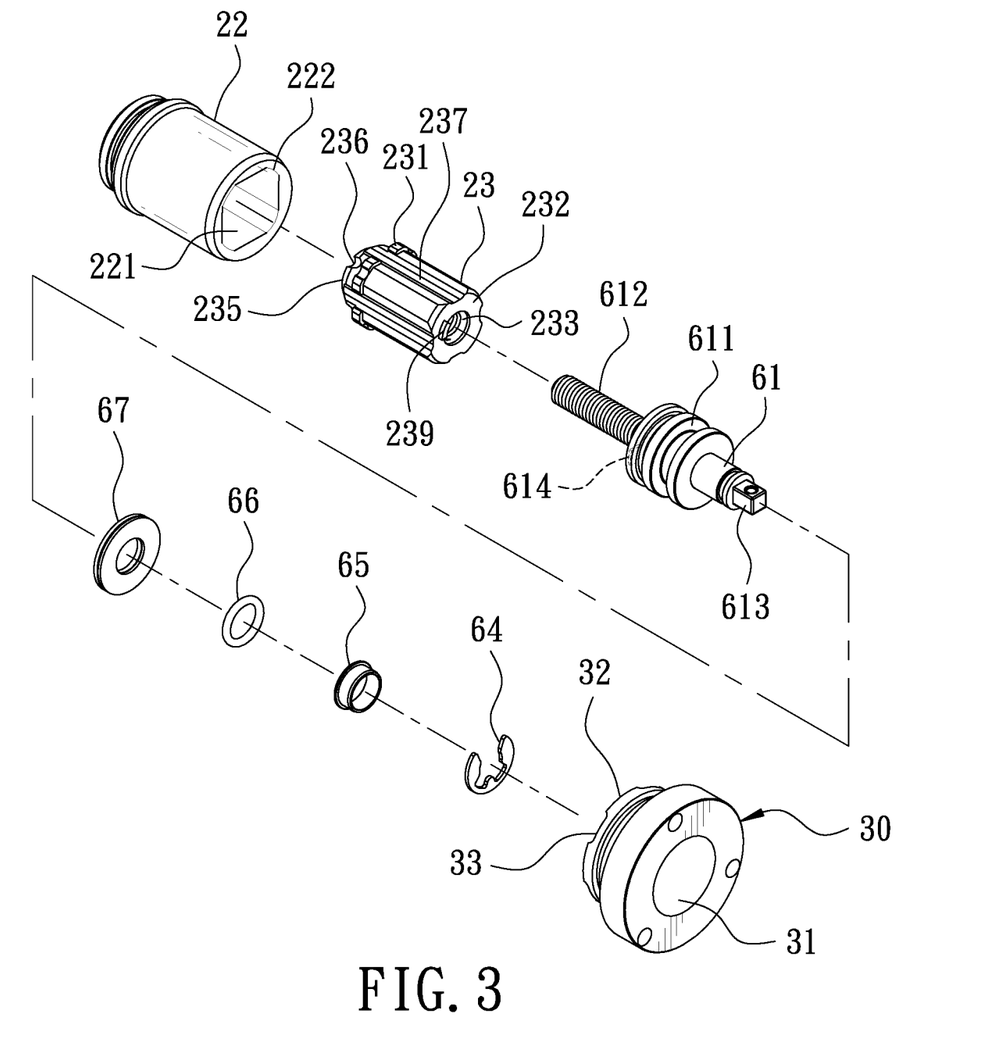
FIG. 3 is an exploded view of the second piston in accordance with the preferred embodiment of the present invention.
Figure 4:
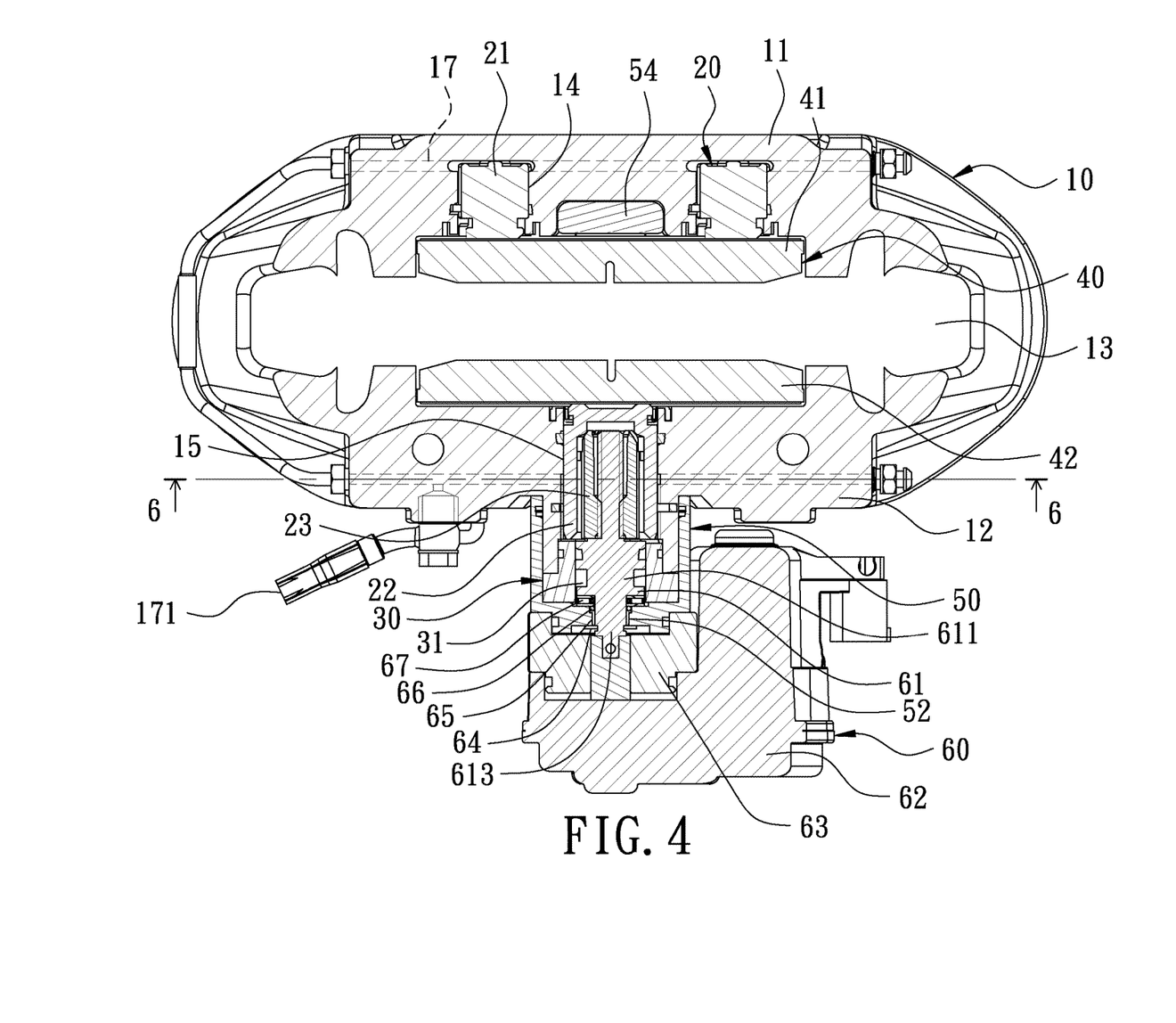
FIG. 4 is a cross-sectional view in accordance with the preferred embodiment of the present invention.

FIG. 3 is an exploded view of the second piston in accordance with the preferred embodiment of the present invention. FIG. 4 is a cross-sectional view in accordance with the preferred embodiment of the present invention. In cooperation with FIG. 2, one side of the second piston 22, facing the outside of the fixed seat 10, is recessed with a receiving groove 221. The inner wall surface of the receiving groove 221 is provided with at least one guide portion 222 parallel to the axis X. The piston unit 20 further includes a pushing member 23 slidably disposed in the receiving groove 221. The outer wall surface of the pushing member 23 is provided with at least one slide portion 231 corresponding to the guide portion 222. The slide portion 231 is slidably connected to the guide portion 222 so that the pushing member 23 is slidable relative to the second piston 22 along the axis X, and has no degree of freedom to rotate relative to the second piston 22. In this embodiment, the receiving groove 221 is in the form of a square hole, and each corner has an arc-shaped groove to form the guide portion 222. The outer wall surface of the pushing member 23 is provided with a correspondingly arc-shaped protrusion to form the slide portion 231, thereby allowing the slide portion 231 to be slidably connected to the guide portion 222. One side of the pushing member 23, facing the outside of the receiving groove 221, has a restricting face 232. The restricting face 232 is formed with a screw hole 233 parallel to the axis X. One end of the drive rod 61 is provided with a shaft portion 611 corresponding to the shaft hole 31. The shaft portion 611 is slidable in the shaft hole 31. Preferably, a sealing ring (not shown) may be provided on the periphery of the shaft portion 611. A screw portion 612 extends from the front end of the shaft portion 611 and corresponds to the screw hole 233. The screw portion 612 is screwed to the screw hole 233. The other end of the drive rod 61 is provided with a connecting portion 613. The connecting portion 613 is rotatably disposed in the positioning hole 52 and is connected to the drive source 62. As shown in FIG. 4, after the connecting portion 613 passes through the positioning hole 52, it is secured by a retaining ring 64, so that the drive rod 61 is secured to the movable seat 50 to be moved along with the movable seat 50. The drive rod 61 is further provided with a bushing 65, a washer 66 and a bearing 67 between the shaft portion 611 and the movable seat 50, so that the drive rod 61 can rotate relative to the movable seat 50. Thereby, the drive source 62 can drive the drive rod 61, so that the drive rod 61 can screw the pushing member 23 to slide in the receiving groove 221, and the pushing member 23 pushes the second piston 22 to slide in the piston hole 15.

Figure 5:
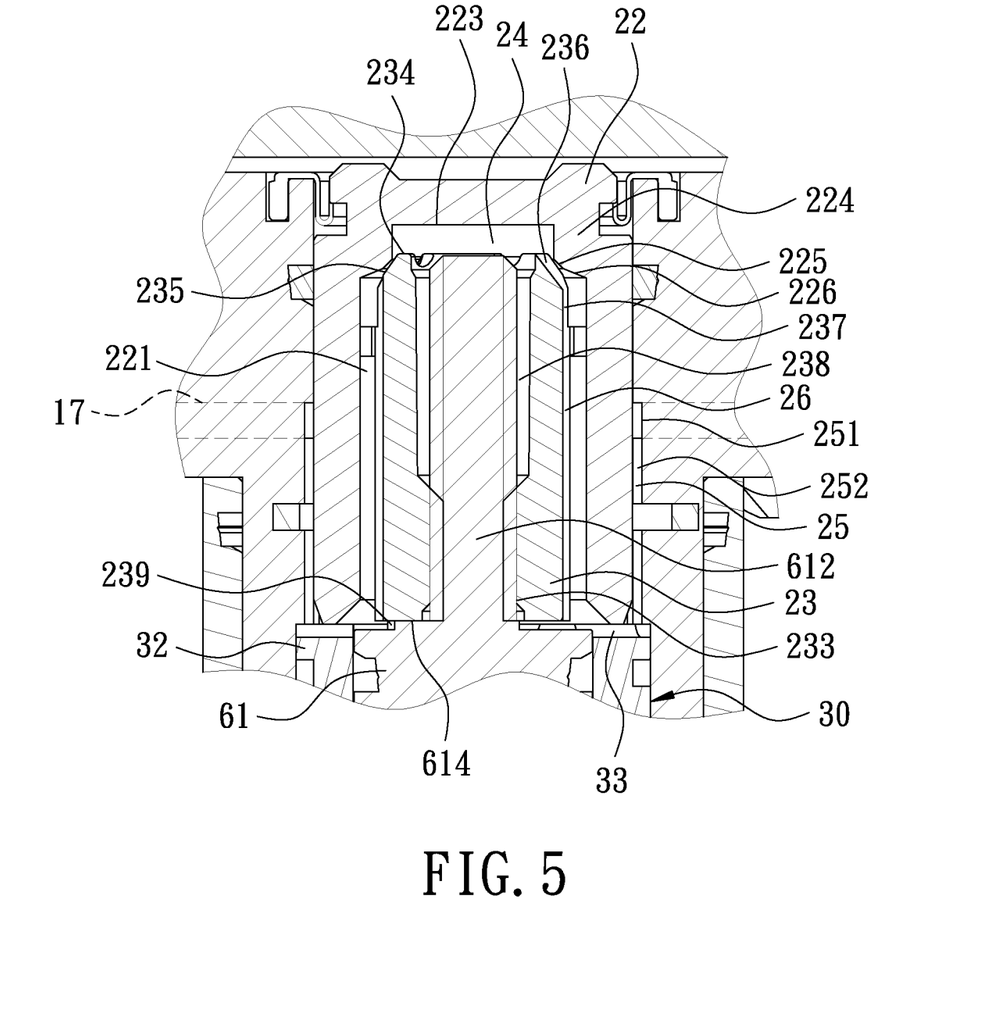
FIG. 5 is a partial enlarged view of FIG. 4.
Figure 6:
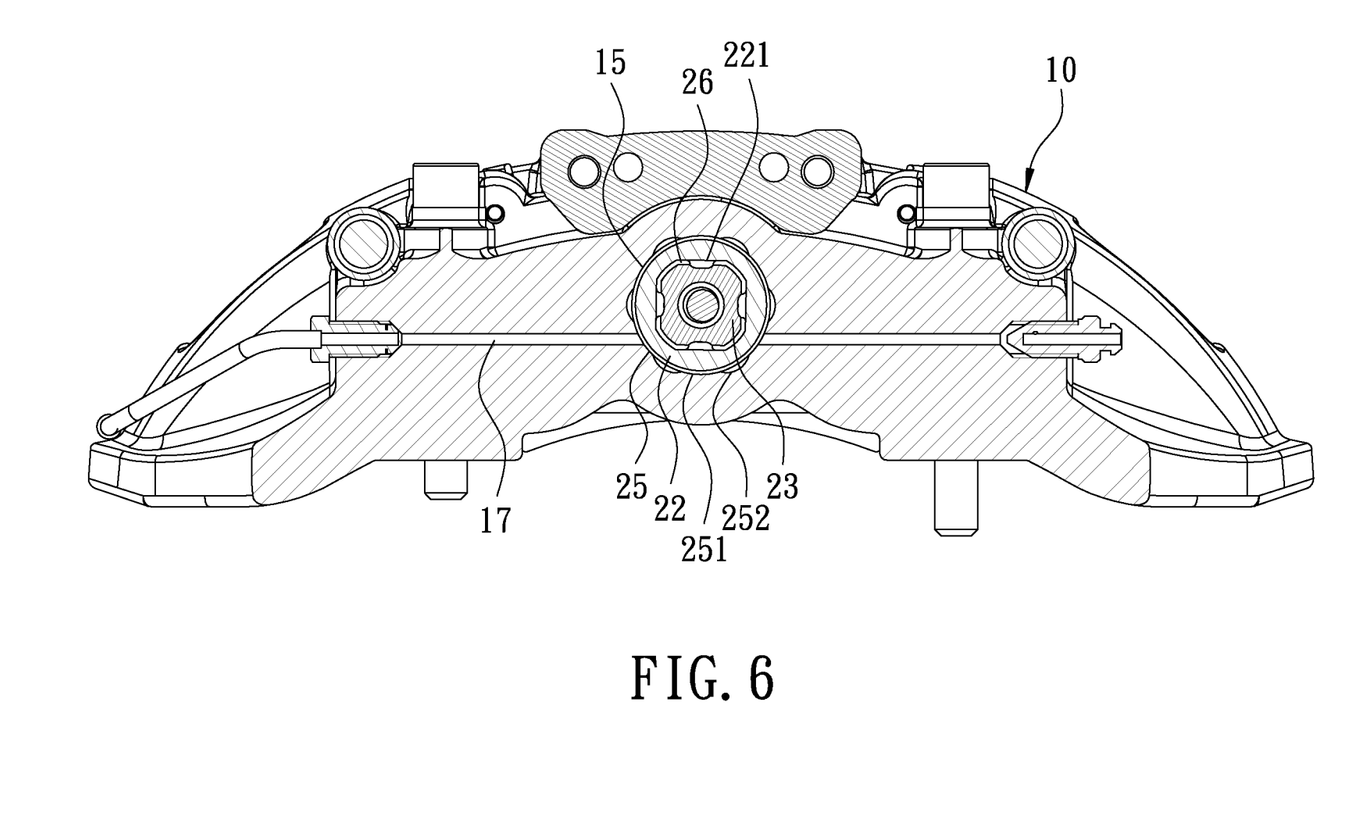
FIG. 6 is a cross-sectional view taken along line 6-6 of FIG. 4.

FIG. 5 is a partial enlarged view of FIG. 4. FIG. 6 is a cross-sectional view taken along line 6-6 of FIG. 4. Please also refer to FIG. 4. The fixed seat 10 further has an oil passage 17 communicating with the piston groove 14 and the piston hole 15. The oil passage 17 has an opening 171. As shown in FIG. 5, the second piston 22 has a pushed face 223 at the bottom of the receiving groove 221. One side of the pushing member 23, facing the pushed face 223, has a pushing face 234. A push space 24 is defined between the pushing face 234 and the pushed face 223. At least one first flow channel 25 is defined between the outer wall surface the second piston 22 and the inner wall surface of the piston hole 15. The first flow channel 25 communicates with the oil passage 17. At least one second flow channel 26 is defined between the inner wall surface the second piston 22 and the outer wall surface of the pushing member 23. The second flow channel 26 communicates with the push space 24. Please refer to FIG. 6. In this embodiment, the inner wall surface of the piston hole 15 has an annular groove 251 communicating with the oil passage 17 and a plurality of elongated grooves 252 parallel to the axis X and communicating with the annular groove 251, so that the first flow channel 25 is defined between the outer wall surface of the second piston 22 and the elongated grooves 252. The diameter of the pushing member 23 is less than the diameter of the receiving groove 221, so that the second flow channel 26 is defined between the inner wall surface of the second piston 22 and the outer wall surface of the pushing member 23.

Please refer to FIG. 3 again. The inner wall surface of the cover 30 has a blocking portion 32 extending toward the piston hole 15. The blocking portion 32 is formed with at least one perforation 33. As shown in FIG. 5, when the second piston 22 slides toward the cover 30 and abuts against the blocking portion 32, the perforation 33 communicates with the first flow channel 25 and the second flow channel 26. A shoulder 224 is formed at the junction of the inner wall surface of the receiving groove 221 and the pushed face 223. The shoulder 224 has a first slope 225 on the inner edge of the shoulder 224 and a second slope 226 between the first slope 225 and the inner wall surface of the receiving groove 221. The first slope 225 and the second slope 226 have different inclinations. An annular slope 235 is formed at the junction of the outer wall surface of the pushing member 23 and the pushing face 234. The annular slope 235 is against the first slope 225. The inclination of the annular slope 235 is different from that of the first slope 225. At least one groove 236 is formed on the annular slope 235. When the annular slope 235 is against the first slope 225, the groove 236 communicates with the second flow channel 26 and the push space 24. Thereby, the oil passage 17 is in communication with the push space 24 through the first flow channel 25, the perforation 33, the second flow channel 26 and the groove 236 in sequence.

Figure 7:
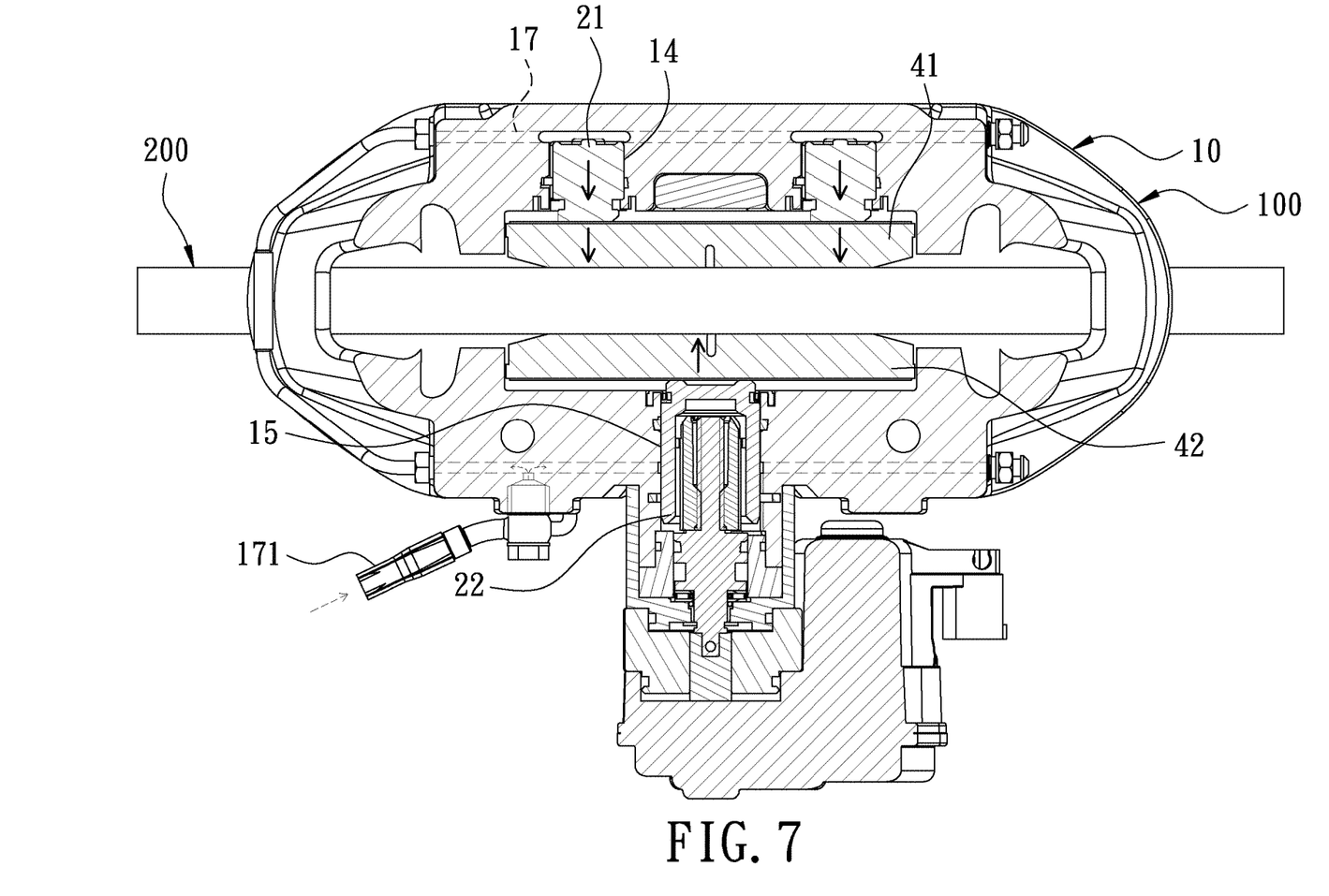
FIG. 7 is a schematic view of the use of the preferred embodiment of the present invention when the foot brake is activated.
Figure 8:
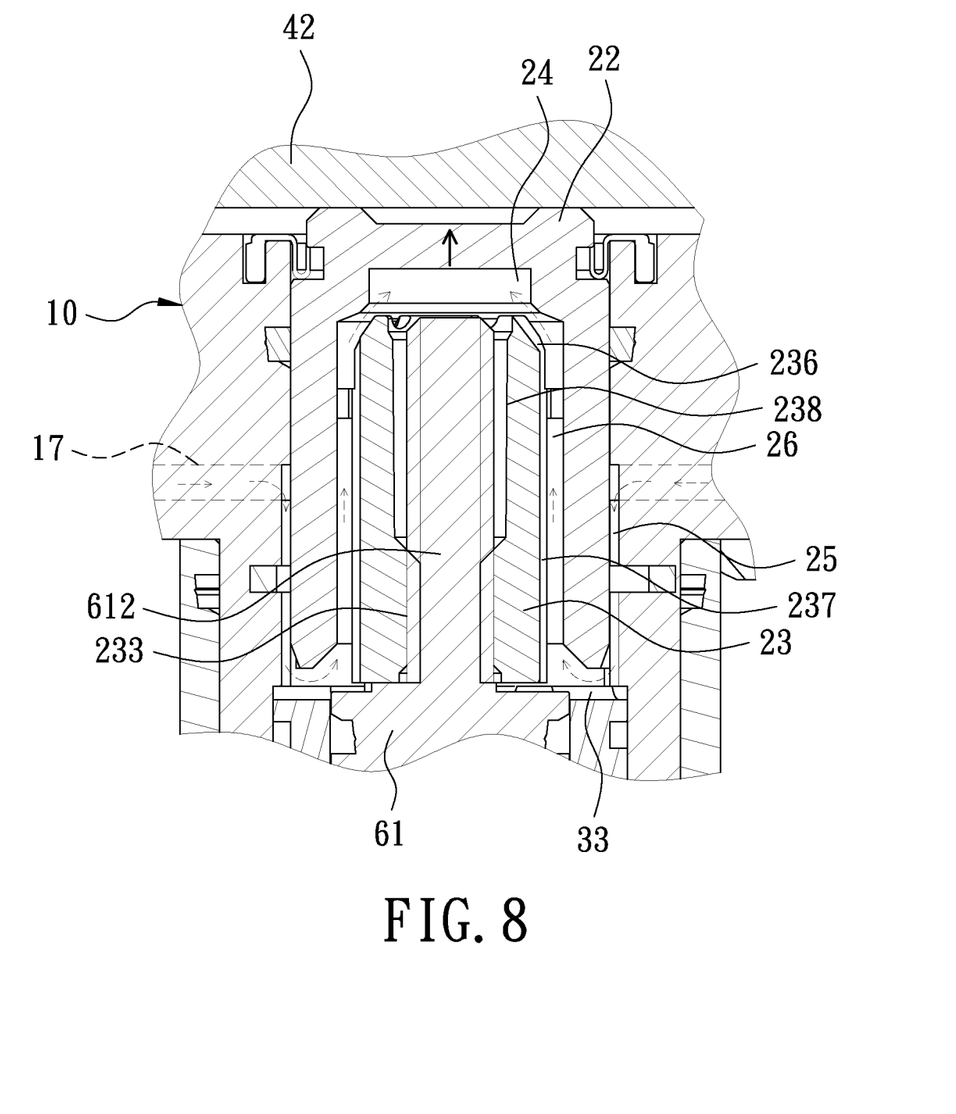
FIG. 8 is a partial enlarged view of FIG. 7.

FIG. 7 is a schematic view of the use of the preferred embodiment of the present invention when the foot brake is activated. FIG. 8 is a partial enlarged view of FIG. 7. The brake caliper 100 is disposed on the periphery of a brake disc 200. When the user activates the foot brake of a vehicle, the hydraulic oil flows into the oil passage 17 from the opening 171. A part of the hydraulic oil flows into the piston groove 14 through the oil passage 17 to push the first piston 21 for driving the first brake lining 41 to be against one side of the brake disc 200. As shown in FIG. 8, the other part of the hydraulic oil flows into the push space 24 through the first flow channel 25, the perforation 33, the second flow channel 26 and the groove 236 in sequence to push the second piston 22 for driving the second brake lining 42 to be against the other side of the brake disc 200. In this way, the first brake lining 41 and the second brake lining 42 are clamped on both sides of the brake disc 200 to achieve the purpose of foot braking. Since the hydraulic oil pushes the second piston 22 from the rear along the axis X, the second piston 22 can push the second brake lining 42 with a larger thrust and a more even force, so as to achieve a better brake effect. Please refer to FIG. 3. The outer wall surface of the pushing member 23 is provided with a plurality of shallow grooves 237 parallel to the axis X for guiding the hydraulic oil to flow along the axis X. The pushing face 234 of the pushing member 23 further has a return hole 238 communicating with the screw hole 233, so that the hydraulic oil flows back to the oil passage 17 through the gap between the screw portion 612 and the screw hole 233 along the return hole 238. Thereby, the hydraulic oil is circulated, so as to avoid the formation of a dead zone in which the hydraulic oil does not flow in the second piston 22. In addition, the first slope 225 and the second slope 226 have different inclinations to form a flared shape, so as to reduce the contact area between the pushing member 23 and the second piston 22. It is beneficial for the hydraulic oil to push the second piston 22 away from the pushing member 23.

Figure 9:
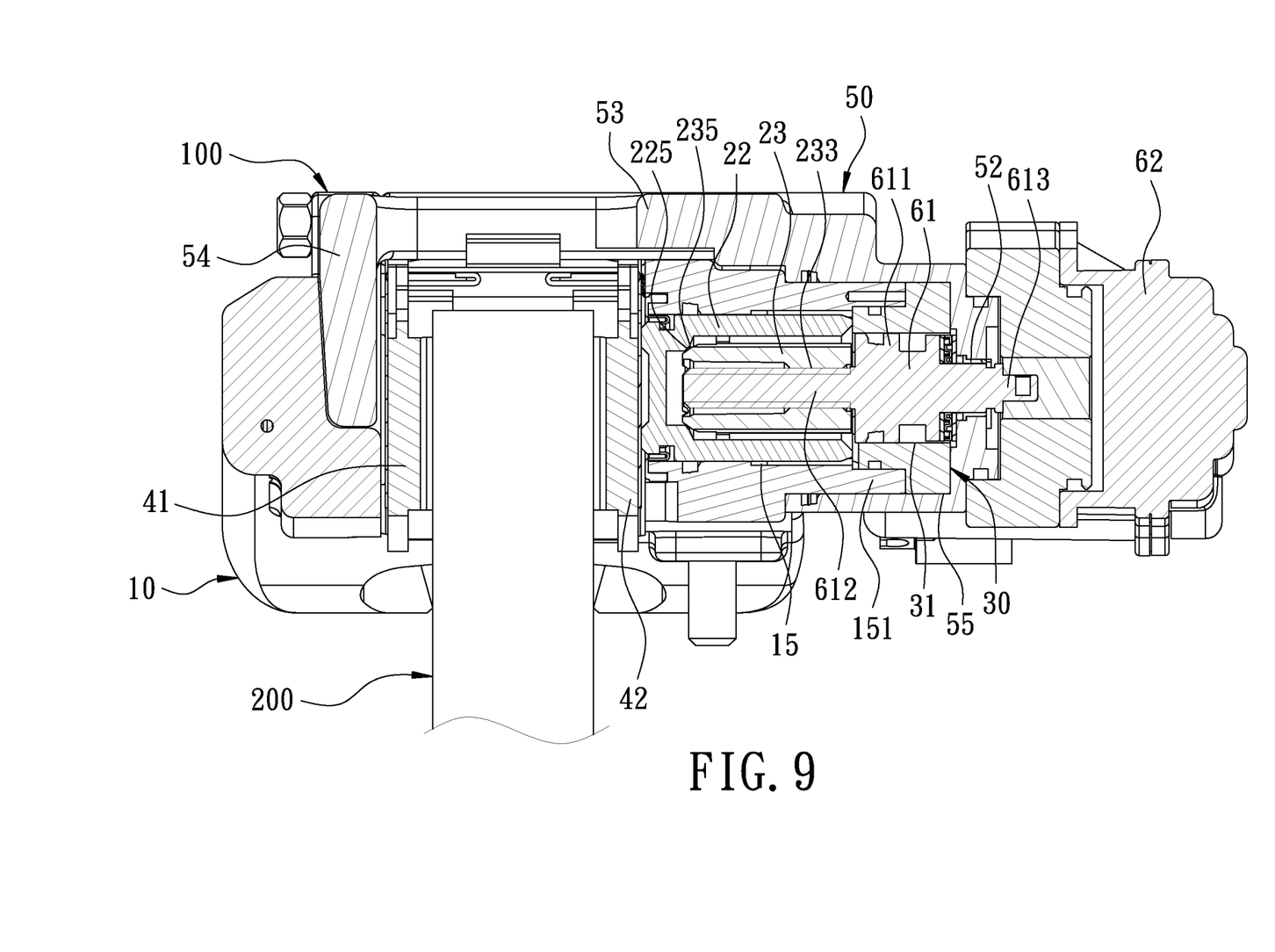
FIG. 9 is a schematic view of the use of the preferred embodiment of the present invention before the handbrake is activated.
Figure 10:
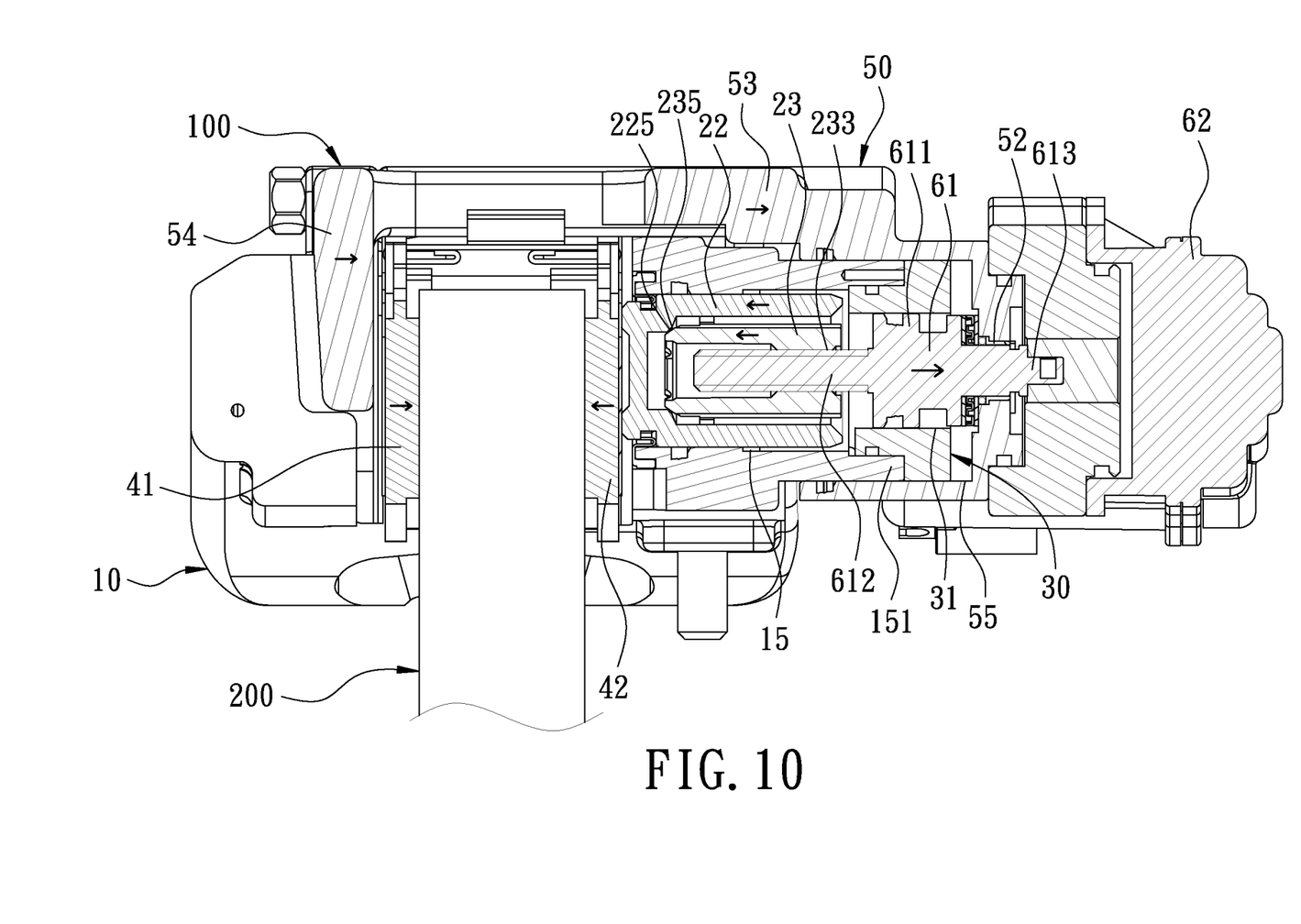
FIG. 10 is a schematic view of the use of the preferred embodiment of the present invention after the handbrake is activated.

FIG. 9 is a schematic view of the use of the preferred embodiment of the present invention before the handbrake is activated. FIG. 10 is a schematic view of the use of the preferred embodiment of the present invention after the handbrake is activated. When the user activates the handbrake, as in this embodiment, the user activates an electronic handbrake button to activate the drive source 62 of the electronic motor mode. The drive source 62 drives the drive rod 61 to start rotating. The pushing member 23 is screwed by the screw portion 612 to move along the axis X toward the second piston 22. The annular slope 235 is against the first slope 225 to push the second piston 22 for driving the second brake lining 42 to be against one side of the brake disc 200. At this time, the drive rod 61 is further rotated, and the drive rod 61 pushes the movable seat 50 to move away from the fixed seat 10 in the opposite direction for the link portion 54 to push the first brake lining 41 against the other side of the brake disc 200. In this way, the first brake lining 41 and the second brake lining 42 are clamped on both sides of the brake disc 200 to achieve the purpose of hand braking. Please refer to FIG. 2. The fixed seat 10 is provided with a raised annular portion 151 on the outer wall surface of the second side wall 12 around the piston hole 15. The movable seat 50 is concavely formed with a slide groove 55 corresponding to the raised annular portion 151. The raised annular portion 151 is slidably accommodated in the slide groove 55. The fixed seat 10 is formed with a plurality of fixing holes 18 on the first side wall 11 for insertion of guide pins 181. The distal end of the link arm 53 of the movable seat 50 is formed with a plurality of guide holes 56 corresponding to the guide pins 181. The guide pins 181 are slidably accommodated in the guide holes 56. Thereby, the stability of the movable seat 50 to slide relative to the fixed seat 10 is improved greatly. Please refer to FIG. 3. The pushing member 23 is provided with a first protrusion 239 on the restricting face 232 adjacent to the screw hole 233. A second protrusion 614 is provided on the shaft portion 611 of the drive rod 61. When the drive rod 61 screws the pushing member 23 out of the receiving groove 221, the restricting face 232 can be prevented from being against the shaft portion 611. When the drive rod 61 rotates in the opposite direction, the first protrusion 239 pushes the second protrusion 614 to drive the pushing member 23 to rotate smoothly, thereby preventing the pushing member 23 from being jammed.

What is claimed is:

1. A brake caliper, comprising:
a fixed seat, having a first side wall, a second side wall opposite to the first side wall, and an accommodating space defined between the first side wall and the second side wall; an inner wall surface of the first side wall having at least one piston groove parallel to an axis and communicating with the accommodating space, an outer wall surface of the second side wall having a piston hole parallel to the axis and communicating with the accommodating space, the fixed seat further having an oil passage communicating with the piston groove and the piston hole, the oil passage having an opening, the outer wall surface of the second side wall further having at least two guide holes parallel to the axis;

a piston unit, including at least one first piston slidably disposed in the piston groove and a second piston slidably disposed in the piston hole, one side of the second piston, facing an outside of the fixed seat, being recessed with a receiving groove, an inner wall surface of the receiving groove being provided with at least one guide portion parallel to the axis, the second piston having a pushed face at a bottom of the receiving groove, the piston unit further including a pushing member slidably disposed in the receiving groove, an outer wall surface of the pushing member being provided with at least one slide portion corresponding to the guide portion, the slide portion being slidably connected to the guide portion so that the pushing member is slidable relative to the second piston along the axis, one side of the pushing member, facing the pushed face, having a pushing face, a push space being defined between the pushing face and the pushed face, one side of the pushing member, facing an outside of the receiving groove, having a restricting face, the restricting face being formed with a screw hole parallel to the axis, at least one first flow channel being defined between an outer wall surface the second piston and an inner wall surface of the piston hole, the first flow channel communicating with the oil passage, at least one second flow channel being defined between an inner wall surface the second piston and the outer wall surface of the pushing member, the second flow channel communicating with the push space;

a cover, disposed on an outside of the piston hole, an inner wall surface of the cover having a blocking portion extending toward the piston hole, the blocking portion being formed with at least one perforation, wherein when the second piston slides toward the cover and abuts against the blocking portion, the perforation communicates with the first flow channel and the second flow channel, an outer wall surface of the cover having a shaft hole corresponding to the screw hole;

a brake lining unit, disposed in the accommodating space, the brake lining unit having a first brake lining disposed close to the first piston and a second brake lining disposed close to the second piston;

a movable seat, disposed adjacent to an outer side of the second side wall, the movable seat being provided with guide posts corresponding to the respective guide holes, the guide posts being inserted through the respective guide holes so that the movable seat can slide relative to the fixed seat parallel to the axis, the movable seat having a positioning hole corresponding to the shaft hole, a peripheral side of the movable seat including a link arm extending toward the first side wall, a distal end of the link arm being provided with a link portion, the link portion being located between the first side wall and the first brake lining;

a drive unit, disposed on the movable seat, the drive unit being movable along with the movable seat, the drive unit having a drive rod that is rotatably disposed in the positioning hole, one end of the drive rod being provided with a shaft portion corresponding to the shaft hole, the shaft portion being slidable in the shaft hole, a screw portion extending from a front end of the shaft portion and corresponding to the screw hole, the screw portion being screwed to the screw hole, another end of the drive rod being provided with a connecting portion for connecting a drive source, the drive rod being driven by the drive source to screw the pushing member to slide in the receiving groove.

2. The brake caliper as claimed in claim 1, wherein the inner wall surface of the piston hole has an annular groove communicating with the oil passage and a plurality of elongated grooves parallel to the axis and communicating with the annular groove, so that the first flow channel is defined between the outer wall surface of the second piston and the elongated grooves.

3. The brake caliper as claimed in claim 1, wherein the pushing member has a diameter less than that of the receiving groove, so that the second flow channel is defined between the inner wall surface of the second piston and the outer wall surface of the pushing member.

4. The brake caliper as claimed in claim 1, wherein a shoulder is formed at a junction of the inner wall surface of the receiving groove and the pushed face, the shoulder has a first slope on an inner edge of the shoulder, an annular slope is formed at a junction of the outer wall surface of the pushing member and the pushing face, the annular slope is against the first slope, the annular slope has an inclination different from that of the first slope, at least one groove is formed on the annular slope, when the annular slope is against the first slope, the groove communicates with the second flow channel and the push space.

5. The brake caliper as claimed in claim 4, wherein a second slope is formed between the first slope and the inner wall surface of the receiving groove, the first slope and the second slope have different inclinations.

6. The brake caliper as claimed in claim 1, wherein an outer wall surface of the pushing member is provided with a plurality of shallow grooves parallel to the axis.

7. The brake caliper as claimed in claim 1, wherein the pushing face of the pushing member further has a return hole communicating with the screw hole.

8. The brake caliper as claimed in claim 1, wherein the fixed seat is provided with a raised annular portion on the outer wall surface of the second side wall around the piston hole, the movable seat is concavely formed with a slide groove corresponding to the raised annular portion, and the raised annular portion is slidably accommodated in the slide groove.

9. The brake caliper as claimed in claim 1, wherein the pushing member is provided with a first protrusion on the restricting face adjacent to the screw hole, and a second protrusion is provided on the shaft portion of the drive rod.

10. The brake caliper as claimed in claim 1, wherein the fixed seat is formed with a plurality of fixing holes on the first side wall for insertion of guide pins, the distal end of the link arm of the movable seat is formed with a plurality of guide holes corresponding to the guide pins, and the guide pins are slidably accommodated in the guide holes, respectively.

* * * * *